Dec. 30, 1947.   C. I. HANEY ET AL   2,433,552
APPARATUS FOR THE TREATMENT OF SOLID MATERIALS WITH LIQUIDS
Filed July 10, 1945
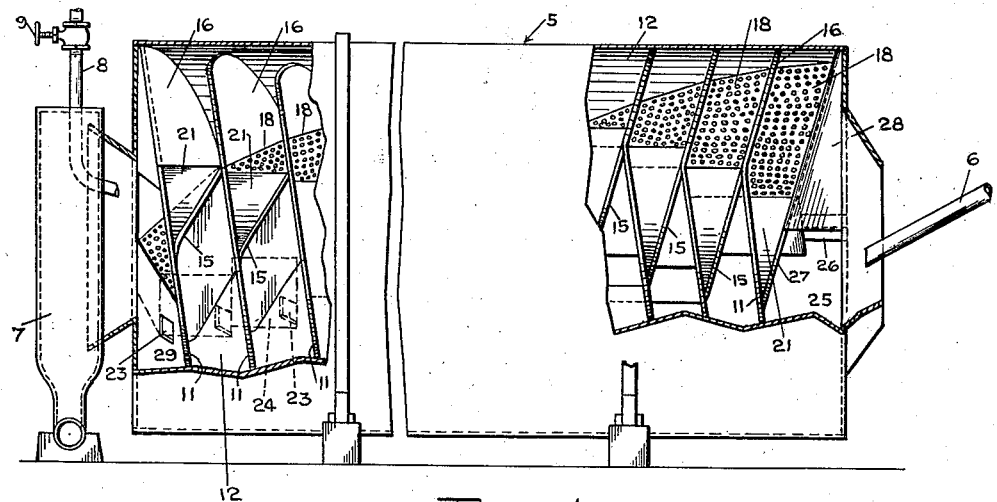
Fig-1
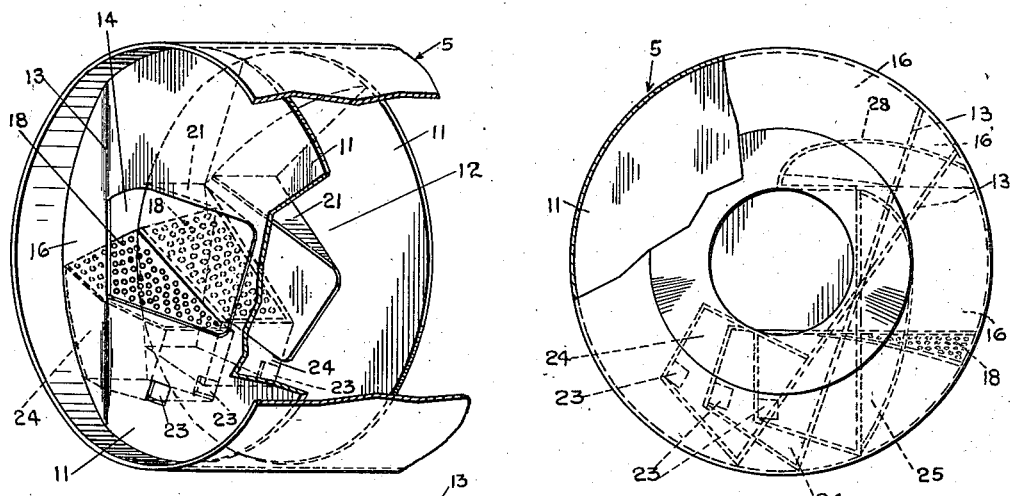
Fig-2
Fig-3
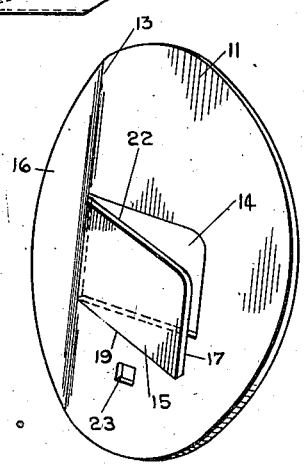
Fig-4
INVENTOR.
C.I. HANEY.
J.G. MITCHELL.
BY
ATTORNEYS.

Patented Dec. 30, 1947

2,433,552

UNITED STATES PATENT OFFICE 2,433,552

APPARATUS FOR THE TREATMENT OF SOLID MATERIALS WITH LIQUIDS

Clifford I. Haney, Greenwich, Conn., and John Gordon Mitchell, Cumberland, Md., assignors to Celanese Corporation of America, a corporation of Delaware Application July 10, 1945, Serial No. 604,114

11 Claims. (Cl. 23—267)

This invention relates to apparatus for bringing substances in the solid phase into contact with substances in the liquid phase, and relates more particularly to apparatus for washing, leaching or extracting a fibrous or granular solid by countercurrent action with a suitable liquid medium.

The apparatus of this invention is an improvement over the apparatus shown and described in Patent No. 2,337,137 to R. F. Thompson and R. A. Stone.

An object of this invention is the provision of an improved apparatus for continuously bringing substances in the solid phase into contact with substances in the liquid phase.

A further object of this invention is to provide an apparatus for continuously washing cellulose acetate, which has been precipitated in particle form from a solution thereof in acetic acid, in such a manner that the cellulose acetate is washed substantially free of acetic acid and the wash liquor is of relatively high acid concentration.

Other objects of this invention, together with certain details of construction and combinations of parts, will appear from the following detailed description and the appended claims.

In many manufactures, the problem arises of treating solid particles with liquid media in which the bulk of the solid is insoluble with a view, for example, to removing constituents from solid material whether by physical action, as in washing or extraction, or by chemical action of the liquid, or with the view to removing constituents from the liquid by the action of the solid for the purpose of purifying the liquid, recovering therefrom the substances removed, or impregnating the solid In the treatment of solids with liquids or liquids with solids, it is obviously advantageous to insure as intimate a contact as possible therebetween. The present invention provides a means whereby this desideratum may be obtained in a continuous manner by causing the treating liquid to pass through the solid particles while the solid particles and the treating liquid are passing each other in opposite directions.

In accordance with this invention, the solid particles are continuously fed into, propelled along, and discharged from, a rotating cylindrical vessel while the liquid is continuously introduced into said vessel and caused to flow through the body of the solid particles as the solid particles move in a direction opposite to that of the liquid, the construction and arrangement of the apparatus being such that the liquid remains in contact with the solid particles for an appreciable length of time. By this means the liquid is brought into intimate contact with the solid particles and, obviously, the treatment is much more effective than if only the liquid flowed, for example, over the surface of the material instead of through it. The apparatus may be used with particular advantage for the treatment of materials with liquids of substantially the same or not very different specific gravities. Moreover, the apparatus may be employed for the treatment of fibrous solids, granular solids, or in fact any solids in a state of division which may be separated on a filter and which will flow from a chute.

In accordance with the present invention, the apparatus for treating solid materials with liquid comprises a rotatable cylindrical vessel containing a number of plates or partitions of novel design dividing said cylindrical vessel into a plurality of compartments. All of the partitions are provided with openings for passing the solid materials therethrough and smaller openings for permitting the passage of liquid from one compartment to another. Each compartment has therein suitable means for passing the solid materials from one compartment to an adjacent compartment and so on through the cylindrical vessel. Means are provided at one end of the apparatus for feeding the solid material thereto, and, at the other or solid material discharge end, for introducing a countercurrent of liquid. The rotation of the cylindrical vessel in the proper direction, as indicated below, causes the solid materials to be passed from one compartment to an adjacent compartment and also the liquid to be passed from one compartment to an adjacent one but in the opposite direction.

We have found that passage of the solid materials through the several compartments of the cylindrical vessel can be expedited to a great degree by employing bent plate partitions and a drainage plate which tilts toward the partition discharge opening.

In the accompanying drawings, wherein a preferred form of our invention is illustrated, Figure 1 is a side elevational view of the apparatus showing a cylindrical vessel partially broken away to show the partitioning of the interior thereof, Figure 2 is a detail view of a section of the cylindrical vessel, broken away to show the interior construction thereof, Figure 3 is an end elevational view of the cylindrical vessel looking from the solid material feed end towards the solid material discharge end, and Figure 4 is a detail view of a bent plate partition.

Like reference numerals indicate like parts throughout the several views of the drawing.

Referring to the drawing for a detailed description of our invention, the device of this invention is shown as comprising a cylindrical vessel, generally indicated by reference numeral 5, which is arranged to be rotated about its horizontal axis by any suitable means (not shown). The cylindrical vessel 5 is provided at one end with a conduit 6 by which the solid material is fed into said cylindrical vessel. The solid material treated in the cylindrical vessel is discharged at the opposite end thereof into a suitable chute 7 from which it is passed into suitable containers for storage, as is well understood in the art. At the solid material discharge end of the cylindrical vessel, there is provided a pipe 8 having a valve 9 for feeding the treating or washing liquid into the cylindrical vessel, either continuously or intermittently as required, the liquid being discharged at the solid material feed end of the cylindrical vessel.

To the inner surface of the cylindrical vessel 5 are fastened in any suitable manner substantially circular plates 11 of novel design which will hereinafter be described in detail, such plates forming partitions dividing the cylindrical vessel into a number of compartments or cells 12. The number of partitions employed depends upon the number of cells desired in the cylindrical vessel and upon the size of said cylindrical vessel as well as upon the use to which the vessel is intended to be put and/or the nature of the material being treated. The plates 11 forming the partitions in the cylindrical vessel are of novel design. Heretofore, in solid particle treating vessels of this type, the partition plates were in a single, substantially vertical plane. Therefore, the particles being treated were thrown in but one direction by the rotation of the cylindrical vessel and the particles passing from one compartment to another were caused to make a substantially right angular turn in a restricted area. This often caused the particles to bridge between the partition plates and remain there so that only a small portion of the solid materials passed from one compartment to another at each revolution of the cylindrical vessel, thus lowering the efficiency of the apparatus. To overcome the disadvantages of the prior apparatus, we employ plates which are bent, and also arrange the plates in the cylindrical vessel so that they are substantially parallel with each other in a plane which is at an angle other than a right angle to a horizontal plane passing through the axis of the cylindrical vessel.

The partition plates 11, as shown in Figure 4, which may be of any suitable metallic sheet material, are bent along a line 13 spaced from the diameter of the partition plate. An opening 14 is then formed substantially centrally of the partition plate by suitably cutting the same so as to leave one edge of the portion cut out integral with the partition plate along the bend-line 13, thereby forming a flap 15. The flap 15 is bent out of the plane of the portion of the partition plate from which it is cut and into the plane of bent portion 16. The partition plates 11 are arranged inside the cylindrical vessel in such a manner that the edge 17 of the flap 15 is in contact with and is preferably welded to the corresponding edge of the opening in the adjacent partition plate in the direction of the discharge end of the cylindrical vessel.

Extending between partition plates 11 and fixed thereto are perforated displacement or drainage plates 18. These drainage plates extend from the periphery of bent portion 16 along one edge 19 of flap 15 to where said flap is attached to the opening 14 of the next succeeding partition plate. The drainage plates 18 are tilted with respect to the plane surface of the bent portion 16 of the partition plate. The tilting of the drainage plate causes the solid material being treated to fall in a line toward the opening 14 in the partition plate and into the next cell. As indicated above, in prior devices, the drainage plates were arranged so that the solid material fell in a line perpendicular to the axis of the treating vessel and had to make a right angular turn to fall into the next cell. These displacement sheets are so arranged that, when viewed from the material discharge end of the vessel and assuming clockwise rotation, they are arranged in an even spiral and off-set an equal angle, of about 20 degrees, from each other clockwise from the feed end to the discharge end of the vessel. It is to be understood, however, that the displacement sheets may be arranged in a double spiral and in this case the displacement sheets will be off-set from each other on an angle of about 40 degrees. However, this angle may be increased to a greater number of degrees under special conditions of size and design to meet special requirements. A substantially triangular shaped deflector 21 is rigidly mounted in each cell between the edge 22 of the flap 15 and the next succeeding partition plate.

In order to provide for the passage of the liquid through the cylindrical vessel in a direction counter to the direction of the flow of the solid material therethrough, the partitions 11 are provided with openings 23 of any desired size or configuration. These openings 23 are positioned in the partition plates so that they empty in the adjacent cell, in the direction of the solid material feed end, liquid which is drained from the solid material on the drainage plates 18. The drained liquid is caught in a receptacle 24 fixed underneath each drainage plate and, since it is passed from the receptacle 24 to the next cell, the drained liquid does not come into contact with the liquid coming from the preceding adjacent cell reducing the degree of freshness thereof. In the end cell, indicated by reference numeral 25, the liquid is discharged into a suitable container outside of the cylindrical vessel 5 by means of a suitable conduit 26. The end cell 25 is provided with a plate 27 extending from the wall of the cylindrical vessel to the edge of opening 14 and performing the same function as flap 15 in the other cells. An additional deflector 28 is also provided in this cell. The cell 29 at the opposite end of the cylindrical vessel does not have a flap 15 as the drainage plate 18 here discharges directly into chute 7.

If desired, manholes may be provided in at least every other cell to permit of easy inspection.

While we prefer to construct our apparatus of stainless steel, it will be appreciated that any other suitable material may be employed. Moreover, the vessel need not be cylindrical but may be in the shape of a prism having any number of sides from three to infinity.

The operation of the apparatus of our invention will now be described in washing of solid particles of material with water. In this case, the solid particles to be treated are fed through conduit 6 into cylindrical vessel 5, rotating at ⅛ to 3 R. P. M., at a rate from 300 to 7000 or 8000 pounds per hour. Water is fed into the opposite end of cylindrical vessel 5 through pipe 8 at a rate of from 1000 to 100,000 pounds per hour. Upon rotation of the cylindrical vessel 5 in a clockwise direction as viewed from the solid material discharge end, the tilted drainage 18, when it reaches its lowermost position, lifts the wet solid particles. During about a 60 degree arc of travel, the wet solid particles drain slowly through the perforations of the drainage plates 18, the liquid draining into receptacle 24 and then, because of the tilted arrangement of the drainage plate, slide off the drainage plate through opening 14 into the adjacent cell. The rotation of the cylindrical vessel also causes the fresh liquid fed into the cylindrical vessel by pipe 8 and then drained liquid from receptacle 24 to discharge into the next compartment counter-current to the flow of the solid particles through the cylindrical vessel. To assist in the discharge of the drain water from receptacles 24, the bottom of said receptacles are tilted in the direction of the flow of the liquid and said bottom being in line with a side of the opening for the liquid. In this manner, the solid particles are propelled through the cylindrical vessel from one cell to the next adjacent cell, falling into the liquid of one cell, which liquid is subsequently drained therefrom and passed on to the next cell in the direction from which the solid particles are flowing.

The angular arrangement of the bent plates, as shown in Figure 1, causes the solid particles to be thrown in a plurality of directions in each cell during the rotation of the cylindrical vessel so that a greater amount of water comes into contact with the solid particles than in smaller apparatus heretofore employed, where the cellulose acetate was thrown in a single direction.

The bending of the partition plates and the tilting of the drainage plates allows the solid particles to drop straight through from cell to cell without bridging or piling up, thus increasing the operational capacity thereof.

The apparatus of the invention is of particular utility in the manufacture of cellulose acetate and like materials, for example cellulose nitrate, formate, propionate or butyrate. In the manufacture of cellulose acetate, the raw acetate obtained by acetylation, whether or not this has been followed by ripening, contains acetic acid which is desirable to remove both with a view to recovery of the acid and to purification of the cellulose acetate. This removal may very conveniently be effected by means of the apparatus of the invention, the raw cellulose acetate being continuously fed into, propelled through and discharged from a counter-current of a liquid capable of dissolving acetic acid but not cellulose acetate. During their passage in opposite directions through the apparatus the liquid becomes progressively richer and the cellulose acetate progressively poorer in acetic acid. As treating liquid, we prefer to use water or other aqueous liquids relatively poor in acetic acid.

The application of the apparatus of the invention to a chemical treatment of flaky or granular materials by liquid media may also be illustrated by reference to the manufacture of cellulose acetate or the like substances. Certain processes result in the production of cellulose acetates containing small quantities of substances, e. g., sulphuric esters of cellulose, which it is desirable to remove with a view to stabilizing the product. This removal is effected in the so-called stabilizing step which frequently comprises treating the cellulose acetate with aqueous solutions containing acid, for example, with very dilute aqueous sulphuric acid solutions at temperatures in the neighborhood of the boiling point. This step may very conveniently be carried out by the process of the invention.

Moreover, where two or more consecutive processes both involving treatment of the solid material with liquids are involved, e. g., in cellulose acetate manufacture, where washing is followed by stabilization which is followed by a further washing, by applying the principles set out above, the various consecutive steps can be combined to give a continuous process. Cellulose acetate may for example be passed in succession through three units of the type described above arranged in series so that the material fed into the first passes through a counter-current of water or other suitable washing liquid, is fed into the second unit where it passes through a counter-current of hot, very dilute sulphuric acid and then into the third unit, where it is washed by a counter-current of water and discharged.

It is to be understood that the foregoing detailed description is given merely by way of illustration and that many variations may be made therein without departing from the spirit of our invention.

Having described our invention, what we desire to secure by Letters Patent is:

1. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel and means in each cell, operable upon rotation of said vessel, arranged to lift said solid particles in its cell at intervals and to discharge said particles through the first-mentioned opening.

2. In apparatus for treating solid materials in particle form with liquid, a vessel rotatable about a horizontal axis, partition plates in said vessel arranged at an angle other than a right angle to the horizontal axis of said vessel and dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel and means in each cell, operable upon rotation of said vessel, arranged to lift said solid particles in its cell at intervals and to discharge said particles through the first-mentioned opening.

3. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel and means, including a drainage plate, in each cell, operable upon rotation of said vessel, arranged to lift said solid particles in its cell at intervals and to discharge said particles through the first-mentioned opening.

4. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel and means, including a tilted drainage plate, in each cell, operable upon rotation of said vessel, arranged to lift said solid particles in its cell at intervals and to discharge said particles through the first-mentioned opening.

5. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel, means, including a tilted drainage plate, in each cell, operable upon rotation of said vessel, arranged to lift said solid particles in its cell at intervals and to discharge said particles through the first-mentioned opening and means for collecting the liquid drain from the solid materials and for passing the same into an adjacent cell.

6. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel, means, including a tilted drainage plate, in each cell, operable upon rotation of said vessel, arranged to lift said solid particles in its cell at intervals and to discharge said particles through the first-mentioned opening and a receptacle in the drainage plate for collecting the liquid drain from the solid materials and for passing the same into an adjacent cell.

7. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel and means, including a drainage plate, in each cell, operable upon rotation of said vessel, arranged to lift said solid particles in its cell at intervals and to discharge said particles through the first-mentioned opening, the lifting surface of the drainage plate forming an obtuse angle with one of the plane surfaces of the partition plate.

8. In apparatus for treating solid materials in particle form with liquid, a vessel rotatable about a horizontal axis, partition plates in said vessel dividing said vessel into series of cells, the planes of said partition plates being inclined to the horizontal axis of the vessel, said partition plates being angularly bent along a line extending across the surface thereof, means for feeding the solid materials at one end of said series of cells and means for feeding liquid at the other end of said series of cells, each partition plate having an opening therein arranged for the passage of solid materials and another opening separated from said first opening and arranged for the passage of liquid in a direction opposite to the passage of said solid materials through said vessel and means, including a drainage plate, in each cell, operable upon rotation of said vessel, arranged to lift said solid particles in its cell at intervals and to discharge said particles through the first-mentioned opening, the lifting surface of the drainage plate forming an obtuse angle with one of the plane surfaces of the partition plate, and being tilted in the direction of the first-mentioned opening.

9. In apparatus for treating solid materials in particle form with liquid, a combination with a vessel rotatable about a horizontal axis, a plate for partitioning said vessel, the plane of said partition plate being inclined to the horizontal axis of the vessel, said partition plate being angularly bent along a line extending across the surface thereof, an opening in one of said surfaces and a flap in the plane of the other of said surfaces.

10. In apparatus for treating solid materials in particle form with liquid, a combination with a vessel rotatable about a horizontal axis, a plate for partitioning said vessel, the plane of said partition plate being inclined to the horizontal axis of the vessel, said partition plate being angularly bent along a line extending across the surface thereof, an opening in one of said surfaces and a flap integral with said partition plate and being in the plane of the other of said surfaces.

11. In apparatus for treating solid materials in particle form with liquid, a combination with a vessel rotatable about a horizontal axis, a plate for partitioning said vessel, the plane of said partition plate being inclined to the horizontal axis of the vessel, said partition plate being angularly bent along a line extending across the surface thereof, an opening in one of said surfaces and a flap of the same dimension as said opening and being in the plane of the other of said surfaces.

CLIFFORD I. HANEY.
JOHN GORDON MITCHELL.

REFERENCES CITED

The following references are of record in the file of this patent:

UNITED STATES PATENTS

| Number | Name | Date |
| --- | --- | --- |
| 2,337,137 | Thompson et al. | Dec. 21, 1943 |

FOREIGN PATENTS

| Number | Country | Date |
| --- | --- | --- |
| 321,577 | France | Jan. 14, 1903 |